DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 7, 1970

873 O.G. 17

T873,003

PHOTOGRAPHIC GELATIN HARDENING COMPOSITION CONTAINING MAGNESIUM SULFATE

Lawrence J. Donivan, 1669 Lake Ave., Rochester, N.Y. 14650

Continuation-in-part of application Ser. No. 595,353, Nov. 18, 1966. This application Sept. 15, 1969, Ser. No. 858,120

Int. Cl. G03c *1/30*

U.S. Cl. 96—111

No Drawing. 12 Pages Specification

The hardening and swelling of photographic gelatin layers is controlled by treatment with acidic aqueous hardening solutions containing magnesium sulfate and an aldehydic gelatin hardening agent such as a mixture of formaldehyde and succinaldehyde bis-bisulfite. The solutions allow the gelatin layers to be carried through the various processing zones of roller transport processing systems without the production of roller pattern on the layers. Crystallization of salts on the apparatus is also avoided. Representative packaged compositions which are dissolved in water to form a working hardening solution comprise (1) a dry mixture of chemicals containing an aldehyde bisulfite, and magnesium sulfate and (2) an aqueous solution of a mixture of acetic acid and formaldehyde.